April 13, 1965 — J. A. CHARNOCK ETAL — 3,178,028
FLUID FILTER CONSTRUCTION
Filed May 16, 1960

Inventors
JOHN ANTHONY CHARNOCK
KURT FINN HAMMER
by: Cavanagh & Norman

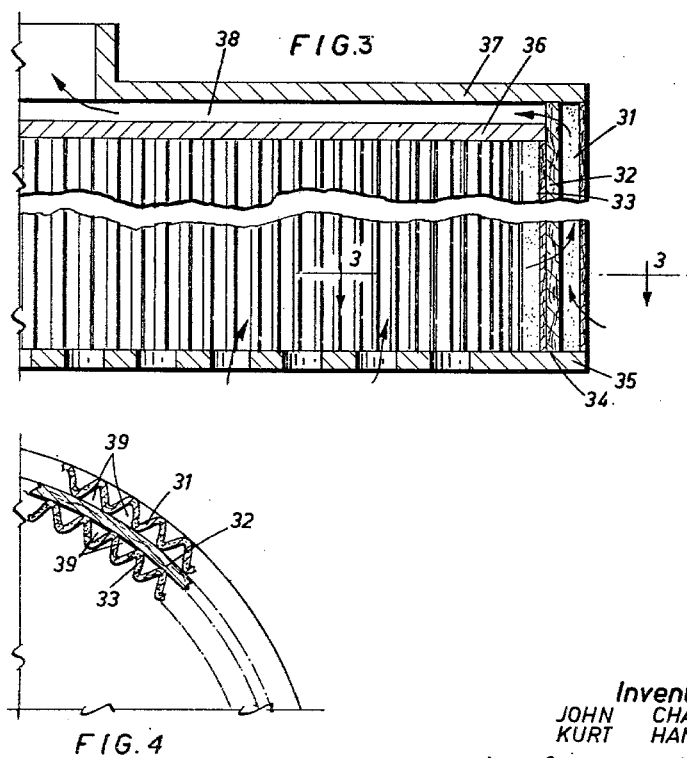

United States Patent Office 3,178,028
Patented Apr. 13, 1965

3,178,028
FLUID FILTER CONSTRUCTION
John A. Charnock and Kurt Finn Hammer, Toronto, Ontario, Canada, assignors, by mesne assignments, to New York Business Development Corporation, Albany, N.Y., a corporation of New York
Filed May 16, 1960, Ser. No. 29,337
Claims priority, application Great Britain, June 24, 1959, 21,682/59
4 Claims. (Cl. 210—487)

This invention generally concerns high pressure fluid filtration means.

In many modern applications, filter units are required which are capable of handling corrosive fluids under considerable pressure. In addition, the fluids may be at very high or very low temperatures and be subject to high frequency pressure reversals. Any one or combination of these factors tends to destroy most filters in a relatively short period.

It has been found that the use of fine mesh stainless steel gauze, that, 20 microns or less of stainless steel or other corrosion resistant material, provides a theoretically suitable filtering medium in many circumstances, particularly for use for corrosive fluids. However, the fineness of the mesh tends to cause a loss of rigidity and strength required if a filter unit is subject to high frequency pressure reversals. A solution has been attempted by sintering the gauze in order to improve its strength. This, however, is a process which has to be carried out with great care in order to avoid distortion of the mesh size. Furthermore, even where sintering techniques are adopted, a degree of loss of rigidity or strength may still occur under the highly stressed operating conditions described.

This invention generally provides a filter construction comprising at least one fine gauge wire mesh filter element, and support means for said filter element, said support means being adapted to contact said filter element at a plurality of points thereby to uniformly support said filter element.

Preferably, the support means for the filter element may be in the form of a heavy gauge wire mesh.

More particularly, the filter element and support means may comprise a sandwich construction of alternating layers of fine mesh wire and heavy gauge support wire.

Conveniently, the filter element may be provided in a corrugated or pleated form supported by the support means thereby to increase the area of the filter element.

Figure 1:
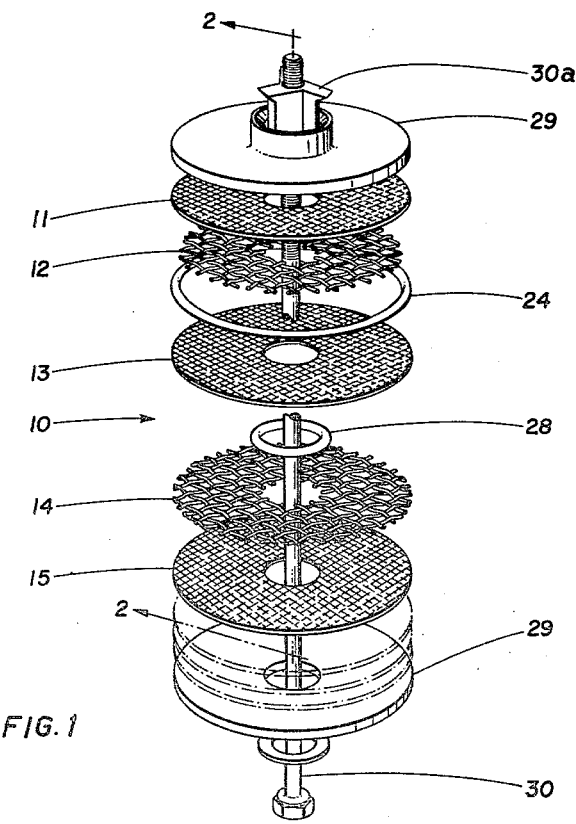
Figure 2:
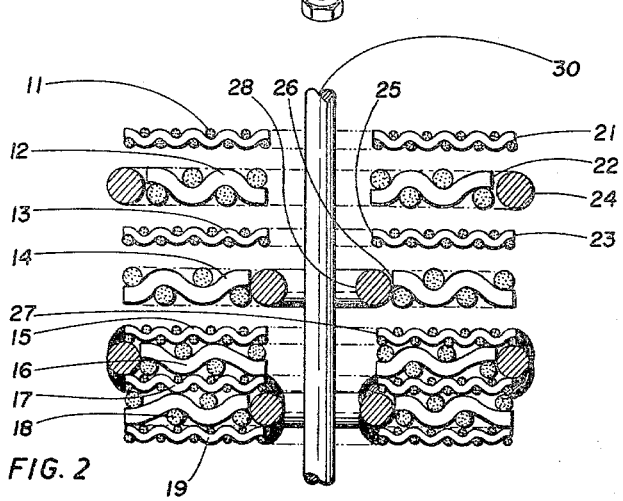

Advantages of the invention will be more readily apparent from a consideration of the following description in conjunction with the drawings in which:

FIGURE 1 is an exploded isometric view of a filter element according to the invention showing one complete group of sandwiched fine and heavy gauge wire mesh filter members and their associated elements exploded for the sake of clarity, further such groups being generally indicated in phantom, FIGURE 2 is a section along the line 2—2 of FIGURE 1 showing one group of filter members spaced apart and a second group thereof united as in the finished filter element, FIGURE 3 shows a cross section of a filter construction in accordance with a further embodiment of the invention, and, FIGURE 4 shows a cross section of the filter unit of FIGURE 3 along the line 3—3 in FIGURE 3.

Referring now to the drawings, there is seen in FIGURES 1 and 2 a filter construction 10 having filter elements 11, 13, 15, 17, 19, etc., of fine gauge wire mesh. In the specification, the term "fine gauge" is used in reference to mesh of around 20 microns or less.

Alternating with filter elements 11, 13, 15, 17, 19, etc., there are provided support means 12, 14, 16, 18, etc., which may be in the form of heavier gauge wire mesh. By heavier gauge wire mesh, reference is made to wire mesh of approximately 40 gauge or thereabouts. It will be appreciated that the gauge of the support means and also of the filter elements are subject to variation depending upon the nature of the use to which the filter is to be put.

It is of course important that the heavy gauge support means should possess sufficient strength to support the filter elements in the course of use for the particular filter. Both filter means 11, 13, 15, 17, 19, etc., and support means 12, 14, 16, 18, etc., may be in the form of circular discs.

The filter elements and support means are joined together in alternating sequence along their inner and outer edges. For example, the outer edge 21 of filter element 11 is joined to the outer edge 22 of support means 12 and the outer edge 23 of filter element 14 in any convenient manner. It is convenient that a spacer element 24 which may be in the form of a stainless steel wire be used between the respective filter elements. The spacer means may be in the form of a .020 inch diameter stainless steel wire silver soldered to filter elements of 20 micron stainless steel gauze together with a 40 gauge stainless steel support element. The inner end of filter element 11, support means 12 and filter element 13 are not joined together for reasons which will become apparent as the description proceeds. The inner end 25 of filter element 13 is, however, joined to the inner end 26 of support means 14 and the inner end 27 of filter element 15 in a manner similar to that described for the outer ends. Again, spacing element 28 is provided between the inner ends of filter element 13 and filter element 15. The remaining elements of the filter unit are joined in the same manner. Top and bottom plates 29 are provided for preventing expansion of the filter element 10 under filtering stresses, being retained and held together by any suitable means such as bolt 30 and star-shaped nut 30a.

It will be seen that the above construction results in a filter unit which permits the entrance of liquid around the peripheries of the outside edges of every other support members, i.e., 14, 18, etc.

It will also be seen that the above construction results in a filter which permits the exit of fluid at the inner edge of the alternate support members 12, 16, etc. Of course, it is equally possible for the fluid to flow in the opposite direction.

It will be noted that for fluid to flow in either direction, it is required to pass through a filter element.

It will also be noted that fluid entering the outside edges of support elements 14 and 18 and leaving through the inside edge of support element 16 will tend to press filter elements 15 and 17 towards each other and against support element 16. Similarly, upon a pressure reversal, filter elements 15 and 17 will be pressed against support means 14 and 18. At the same time, however, filter elements 13 and 19 will also be pressed against support elements 14 and 18 but in the opposite direction. Thus there is always a tendency for the filter elements to be driven against the support members even upon pressure reversals. In this way, flexing and violent vibration of the filter elements is minimized adding greatly to their endurance qualities.

The above construction provides a further advantage in that an extremely high area of the filter elements could be utilized in a very small overall space. This filter unit may be utilized in any convenient containing means, not shown.

A further advantage of the filter construction of the embodiment of the invention shown in FIGURES 1 and 2, lies in the fact that even without the use of sintering techniques sufficient rigidity in the filter elements can be achieved for many circumstances.

However, where conditions indicate its suitability, filter means 11, 13, 15, 17, 19, etc., can be provided by sintered bronze discs such as are generally described in application Serial No. 820,690, filed June 16, 1959. In said application, filter means are described comprising sintered bronze discs having spacing means formed integrally therewith, and, when such discs are substituted for the stainless steel gauze of FIGURES 1 and 2 such spacing means may be dispensed with, support means 12, 14, 16 and 18 providing adequate support for said discs in the manner described above. Similarly, said discs may be formed with integral peripheral and internal flanges, as in said co-pending application, or alternatively, such flanges may be dispensed with, spacer elements 24 and 26, as shown in FIGURES 1 and 2 hereof, performing substantially the same function in the manner described.

FIGURE 3 shows a further embodiment of the invention in which the filter elements 31 and 33 are disposed cylindrically about central support member 32. The filter elements 31 and 33 are crimped or corrugated in the manner shown thus increasing the filtration area.

The advantage of this form of the invention lies in increased area of filtration in relation to weight and/or volume of the filter unit. It has been found, however, that in this form it is desirable to sinter the filter elements before folding or crimping so as to maintain the geometry of the weave.

The filter elements 31, 33 and strengthening member 32 are joined together at their lower ends generally as indicated at 34 to a strengthening or retaining member 35. The upper end of the inner filter element 33 is joined to a sealing member 36. The upper end of outer filter element 31 is similarly joined to sealing plate 37 which is spaced apart from sealing member 36 leaving conduit space 38. In this construction fluid is free to flow from either side of filter elements 31 and 33 through the filters upwardly in the channel spaced left by the crimping of the filter elements, indicated generally at 39, to conduit 38. Again, the flow will be reversed upon a pressure reversal.

It will be appreciated that the number and size of the filter elements and strengthening members may be varied as desired.

It will be appreciated to those skilled in the art that variations and modifications may be made without departing from the scope of the invention as defined in the following claims.

What we claim is:

1. A high pressure fluid filter construction comprising: a plurality of fine gauge disc-shaped filter elements, each having an inner and an outer periphery, said inner periphery defining a similarly located opening in each; generally disc-shaped support members of coarse mesh material interposed between and intimately contacting respective filter elements, each having an inner and an outer periphery said inner periphery defining a similarly located opening in each in registration with said filter element openings, said support members being relatively freely permeable for permitting free flow of filter fluids between adjoining filter elements; annular metallic spacing elements of substantially the same thickness as said support members extending around alternate outer and inner peripheries thereof; means welding the outer peripheries of alternate pairs of said filter elements to said spacing elements therebetween to seal the same against passage of filtering fluids therebetween thereby to define a series of joined pairs of said filter elements having a continuous peripheral opening between any two adjoining said pairs for passage of filter fluids therebetween; means welding the inner peripheries of adjacent filter elements in adjoining said pairs of elements to said spacing elements therebetween to seal the same against passage of filtering fluids therebetween and thereby defining a continuous inner peripheral opening within each said joined pair of filter elements in communication with said other peripheral openings solely through said filter elements; and retaining means forming said filter elements into a stack and resisting separation thereof under filtering stresses.

2. A high pressure fluid filter construction as claimed in claim 1 wherein the diameter of alternate said support members is smaller than the diameter of its adjacent said filter elements thereby defining an annular space between said filter elements for reception of a said spacing element therein.

3. A high pressure fluid filter construction as claimed in claim 1 wherein the diameter of the said openings of alternate said support members is larger than the diameter of said openings of its adjacent said filter elements thereby defining an annular space between said filter elements for reception of a said spacing element therein.

4. A high pressure fluid filter construction as claimed in claim 1 wherein said retaining means includes end plates at both ends of said stack and means extending between said end plates restraining relative movement thereof in response to filtering stresses in said stack.

References Cited in the file of this patent

UNITED STATES PATENTS

| | | |
|---|---|---|
| 1,639,132 | Greene | Aug. 16, 1927 |
| 1,639,133 | Greene | Aug. 16, 1927 |
| 2,423,547 | Behlen | July 8, 1947 |
| 2,430,078 | Reinsch | Nov. 4, 1947 |
| 2,464,036 | Hasselwander | Mar. 8, 1949 |
| 2,495,095 | Ewbank | Jan. 17, 1950 |
| 2,569,745 | Cook | Oct. 2, 1951 |
| 2,730,241 | Thomas | Jan. 10, 1956 |
| 2,887,230 | Sicard | May 19, 1959 |
| 2,902,161 | Humbert | Sept. 1, 1959 |

FOREIGN PATENTS

| | | |
|---|---|---|
| 227,550 | Great Britain | Jan. 22, 1925 |
| 577,765 | Great Britain | Apr. 6, 1945 |
| 787,870 | Great Britain | Dec. 18, 1957 |